(12) United States Patent
Stuedi et al.

(10) Patent No.: US 8,701,155 B2
(45) Date of Patent: Apr. 15, 2014

(54) COMMUNICATING USING A CLOUD INFRASTRUCTURE

(75) Inventors: Patrick Stuedi, Palo Alto, CA (US); Mahesh Balakrishnan, Mountain View, CA (US); Iqbal Mohomed, Mountain View, CA (US); Venugopalan Ramasubramanian, Mountain View, CA (US); Zhuoqing Morley Mao, Ann Arbor, MI (US); Edward P. Wobber, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/814,493

(22) Filed: Jun. 14, 2010

(65) Prior Publication Data

US 2011/0208958 A1 Aug. 25, 2011

Related U.S. Application Data

(60) Provisional application No. 61/306,987, filed on Feb. 23, 2010.

(51) Int. Cl.
*G06F 17/00* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 2002/0090934 A1 | 7/2002 | Mitchelmore | |
| 2006/0168318 A1 | 7/2006 | Twiss | |
| 2006/0282876 A1* | 12/2006 | Shelest et al. | 726/1 |
| 2008/0259793 A1 | 10/2008 | Bauer et al. | |
| 2009/0222721 A1 | 9/2009 | Parkinson | |
| 2009/0299972 A1* | 12/2009 | Merchant et al. | 707/3 |
| 2009/0300344 A1* | 12/2009 | Maurya et al. | 713/150 |
| 2012/0166582 A1* | 6/2012 | Binder | 709/217 |
| 2012/0204032 A1* | 8/2012 | Wilkins et al. | 713/170 |

OTHER PUBLICATIONS

Sadeh, et al., "Understanding and Capturing Peoples Privacy Policies in a Mobile Social Networking Application", Retrieved at http://www.cs.cmu.edu/~sadeh/Publications/Privacy/People%20Finder%20PUC.pdf>>, Personal and Ubiquitous Computing, vol. 13, No. 6, Aug. 2009, pp. 14.*

(Continued)

*Primary Examiner* — Kambiz Zand
*Assistant Examiner* — Abiy Getachew
(74) *Attorney, Agent, or Firm* — Micah Goldsmith; Andrew Sanders; Micky Minhas

(57) ABSTRACT

A cloud infrastructure that communicates with computing devices is provided. The computing devices install filters on other computing devices that they wish to receive items from including pictures, messages, and documents. The filters include criteria that are evaluated on the computing devices, rather than at a server, to determine if an item may be sent to another computing device. The computing devices may then send items that match the criteria to the cloud infrastructure, and the items may be stored and queued for delivery to other computing devices. The items may be encrypted before being provided to the cloud infrastructure, and decrypted when received by the computing devices.

20 Claims, 5 Drawing Sheets

(56) References Cited

OTHER PUBLICATIONS

Sadeh, et al., "Understanding and Capturing Peoples Privacy Policies in a Mobile Social Networking Application", Retrieved at http://www.cs.cmu.edu/~sadeh/Publications/Privacy/People%20Finder%20PUC.pdf>>, Personal and Ubiquitous Computing, vol. 13, No. 6, Aug. 2009, pp. 14.*

Sadeh, et al., "Understanding and Capturing Peoples Privacy Policies in a Mobile Social Networking Application", Retrieved at http://www.cs.cmu.edu/~sadeh/Publications/Privacy/People%20Finder%20PUC.pdf >>, Personal and Ubiquitous Computing, vol. 13, No. 6, Aug. 2009, pp. 14.*

Skonnard, Aaron, "A Developer's Guide to Service Bus in Windows Azure platform AppFabric", Retrieved at << http://download.microsoft.com/download/F/D/8/FD863D17-E85E-478C-B06F-6825D50EA103/A%20Developer's%20Guide%20to%20Service%20Bus%20in%20Windows%20Azure%20platform%20AppFabric.docx >>, Nov. 2009, pp. 48.

Staimer, Marc, "Clouds: Long-Term Fix for Data Storage Obsolescence", Retrieved at << http://www.internetevolution.com/author.asp?section_id=768&doc_id=185676 >>, Dec. 10, 2009, pp. 7.

"This Message Will Self-destroy in 30"!", Retrieved at <<http://blog.rootshell.be/2009/07/29/this-message-will-self-destroy-in-30/ >>, Retrieved Date: Feb. 18, 2010, pp. 4.

Karp, et al., "GPSR: Greedy Perimeter Stateless Routing for Wireless Networks", Retrieved at << http://www.eecs.harvard.edu/~htk/publication/2000-mobi-karp-kung.pdf >>, International Conference on Mobile Computing and Networking, Proceedings of the 6th annual international conference on Mobile computing and networking, Aug. 6-11, 2000, pp. 12.

Balasubramanian, et al., "Energy Consumption in Mobile Phones: A Measurement Study and Implications for Network Applications", Retrieved at << http://www.cs.umass.edu/~arunab/paper/tailender-imc09.pdf>>, Internet Measurement Conference, Proceedings of the 9th ACM SIGCOMM conference on Internet measurement conference, Nov. 4-6, 2009, pp. 14.

Ballani, et al., "Off by Default", Retrieved at << http://conferences.sigcomm.org/hotnets/2005/papers/ballani.pdf >>, In Proceedings of the Fourth Workshop on Hot Topics in Networks, Nov. 2005, pp. 1-6.

Boneh, et al., "Public Key Encryption with Keyword Search", Retrieved at << http://citeseerx.ist.psu.edu/viewdoc/download?doi=10.1.1.3.9475&rep=rep1&type=pdf >>, In Advances in Cryptology, Eurocrypt 2004, vol. 3027 of LNCS, 2004, pp. 1-15.

Ford, et al., "Persistent Personal Names for Globally Connected Mobile Devices", Retrieved at << http://pdos.csail.mit.edu/papers/uia:osdi06.pdf >>, Operating Systems Design and Implementation, Proceedings of the 7th symposium on Operating systems design and implementation, Nov. 6-8, 2006, pp. 16.

Cáceres, et al., "Virtual Individual Servers as Privacy-Preserving Proxies for Mobile Devices", Retrieved at << http://66.102.9.132/search?q=cache%3AarhaWTAiT50J%3Awww.kiskeya.net%2Framon%2Fwork%2Fpubs%2Fmobiheld09.pdf+Virtual+individual+servers+as+privact-preserving+proxies+for+mobile+devices&hl=en >>, Applications, Technologies, Architectures, and Protocols for Computer Communication, Proceedings of the 1st ACM workshop on Networking, systems, and applications for mobile handhelds, Aug. 17, 2009, pp. 8.

Eugster, et al., "The Many Faces of Publish/Subscribe", Retrieved at << http://citeseerx.ist.psu.edu/viewdoc/download;jsessionid=CD823A408A29135F406CFD0BEDCBF69E?doi=10.1.1.10.1076&rep=rep1&type=pdf >>, ACM Computing Surveys (CSUR), vol. 35, No. 2, Jun. 2003, pp. 114-131.

Li, et al., "Majab: improving resource management for web-based applications on mobile devices", Retrieved at <<http://delivery.acm.org/10.1145/15600000/155827/p95-li.pdf?key1=1555827&key2=9569656621&coll=GUIDE&dl=GUIDE&CFID=76809729&CFTOKEN=58430476 >>, International Conference On Mobile systems, application, and services, Jun. 22-25, 2009, pp. 95-108.

Pietiläinen, et al., "Mobiclique: Middleware for Mobile Social Networking", Retrieved at <<http://conferences.sigcomm.org/sigcomm/2009/workshops/wosn/papers/p49.pdf >>, Applications, Technologies, Architectures, and Protocols for Computer Communication, Proceedings of the 2nd ACM workshop on Online social networks, Aug. 17, 2009, pp. 49-54.

Qureshi, et al., "Horde: Separating Network Striping Policy from Mechanism", Retrieved at <<http://nms.csail.mit.edu/papers/horde-mobisys-2005.pdf>>, International Conference On Mobile Systems, Applications And Services, Proceedings of the 3rd international conference on Mobile systems, applications and services, Jun. 6-8, 2005, pp. 14.

Ramasubramanian, et al., "Cimbiosys: A Platform for Content-based Partial Replication", Retrieved at << http://66.102.9.132/search?q=cache:w7KloKnqilkJ:research.microsoft.com/pubs/56258/tr-2008-116.pdf+Cimbiosys:+a+platform+for+content-based+partial+replication&cd=1&hl=en&ct=clnk >>, Proceedings of the 6th USENIX symposium on Networked systems design and implementation, Apr. 22-24, 2009, pp. 19.

Ristenpart, et al., "Hey, You, Get off of My Cloud: Exploring Information Leakage in Third-party Compute Clouds",. Retrieved at <<http://cseweb.ucsd.edu/~hovav/dist/cloudsec.pdf >>, Conference on Computer and Communications Security, Proceedings of the 16th ACM conference on Computer and communications security, Nov. 9-13, 2009, pp. 14.

Rosu, et al., "PAWP: A Power Aware Web Proxy for Wireless LAN Clients", Retrieved at << http://ieeexplore.ieee.org/Xplore/login.jsp?url=http%3A%2Fieeexplore.ieee.org%2Fiel5%2F9476%2F30062%2F10377329.pdf%3Farnumber%3D1377329&authDecision=-203 >>, Proceedings of the Sixth IEEE Workshop on Mobile COmputing Systems and Applications (WMCSA), Dec. 2-3, 2004, pp. 3.

Sadeh, et al., "Understanding and Capturing Peoples Privacy Policies in a Mobile Social Networking Application", Retrived at << http://www.cs.cmu.edu/~sadeh/Publications/Privacy/People%20Finder%20PUC.pdf >>, Personal and Ubiquitous Computing, vol. 13, No. 6, Aug. 2009, pp. 14.

Shih, et al., "Wake on Wireless: An Event Driven Energy Saving Strategy for Battery Operated Devices", Retrieved at <<http://www.singmobile.org/mobicom/2002/papers/p053-shih.pdf >>, International Conference on Mobile Computing and Networking, Proceedings of the 8th annnual international conference on Mobile computing and networking, Sep. 23-28, 2002, pp. 12.

Song, et al., "Practical Techniques for Searches on Encrypted Data", Retrieved at << http://www.cs.berkeley.edu/~dawnsong/papers/se.pdf >>, SP, Proceedings of the 2000 IEEE Symposium on Security and Privacy, May 14-17, 2000, pp. 12.

Sorber, et al., "Turducken: Hierarchical Power Management for Mobile Devices", Retrieved at << http://prisms.cs.umass.edu/mcorner/papers/sorber-05-01.pdf >>, International Conference On Mobile Systems, Applications And Services, Proceedings of the 3rd international conference on Mobile systems, applications, and services, Jun. 6-8, 2005, pp. 1-14.

Su, et al., "Haggle: Seamless Networking for Mobile Applications", Retrieved at << http://66.102.9.132/search?q=cache%3AzaPtTgzpDzEJ%3Aresearch.microsoft.com%2Fen-us%2Fum%2Fpeople%2Fjws%2Fpubfiles%2Fhaggle-ubicomp2007.pdf+Haggle%3A+Seamless+networking+for+mobile+applications&hl=en >>, In Proceedings of the Ninth International Conference on Ubiquitous Computing (UbiComp 2007), Oct. 2007, pp. 24.

Zhang, et al., "Bootstrapping Deny-by-default Access Control for Mobile Ad-Hoc Networks", Retrieved at <<ftp://gaia.cs.umass.edu/pub/Zhang08_bootstrap.pdf >>, IEEE Military Communications Conference, MILCOM, Nov. 16-19, 2008, pp. 1-7.

* cited by examiner

COMMUNICATING USING A CLOUD INFRASTRUCTURE

CROSS-REFERENCE TO RELATED APPLICATIONS

This application claims priority to U.S. Provisional Patent Application Ser. No. 61/306,987, filed on Feb. 23, 2010, the contents of which are hereby incorporated in their entirety.

BACKGROUND

Mobile devices connected to 3G networks are enabling new and diverse applications. One class of application consists of data sharing services, where data generated by a device (e.g., location updates, photos, video clips, and real-time feeds) is shared with other devices based on specific policies. These policies are usually based on the generated content; for example, a tourist backpacking through Europe with a smart phone may want to broadcast her location to friends who live nearby (e.g., location-sharing), receive messages that mention her name, share videos that her family wants to see, or even receive a feed from her home's security camera if it detects movement.

Currently, such services are structured as client-server applications within a cloud computing infrastructure. Cloud computing is Internet-based computing, whereby shared resources, software and information are provided to computers and other devices on-demand. The majority of cloud computing infrastructure comprises reliable services delivered through data centers and built on servers. Clouds often appear as single points of access for users' computing needs. Data generated by a device is uploaded via 3G to a central server which provides it selectively to other devices. The centralized approach allows data to be uploaded just once by a sender for multiple recipients, without requiring any of them to be online at the time. As an additional benefit, client-server applications do not require inbound connections into devices, allowing ISPs (Internet service providers) to provide greater security by blocking such connections.

However, the centralized approach can be inefficient if devices generate substantial data that few devices wish to receive. In the example of a location-sharing application, the device will continually upload its location to the cloud even if nobody lives nearby, wasting network resources and battery life in the process. Also, with respect to privacy, users expose the data to application servers and the third-party cloud providers hosting them, and potentially even to other customers of the same cloud. Since the centralized server of the cloud has to apply sharing policies on the data, simple encryption is not a viable solution.

SUMMARY

A cloud infrastructure that communicates with a plurality of computing devices (e.g., mobile devices) is provided. The computing devices install filters on other computing devices that they wish to receive items from including pictures, messages, and documents. The filters include criteria that are evaluated on the computing devices, rather than at a server, to determine if an item may be sent to another computing device. The computing devices may then send items that match the criteria to the cloud infrastructure, and the items may be stored and queued for delivery to other computing devices. The items may be encrypted before being provided to the cloud infrastructure, and decrypted when received by the computing devices.

In an implementation, a filter is received from a cloud infrastructure by a first computing device through a network. The filter has associated criteria and is associated with a second computing device. An item is generated by the first computing device. It is determined by the first computing device whether the generated item satisfies the associated criteria of the filter, and if so, the generated item is provided by the first computing device to a cloud infrastructure for delivery to the second computing device.

Implementations may include some or all of the following features. The generated item may be encrypted using a channel key. A list of computing devices trusted by the first computing device may be published to the cloud infrastructure by the first computing device. A filter may be received from the second computing device for delivery to the first computing device by the cloud infrastructure. It is determined if the second computing device is on the list of computing devices trusted by the first computing device, and if so, the filter may be provided to the first computing device by the cloud infrastructure. The generated item may be received at the cloud infrastructure, and the generated item may be associated with a queue corresponding to the second computing device. The generated item may be stored in a cache by the cloud infrastructure. A request may be received at the cloud infrastructure from the second computing device for any items associated with the queue corresponding to the second computing device. Any items associated with the queue corresponding to the second computing device may be determined by the cloud infrastructure. The determined items may be retrieved from the cache by the cloud infrastructure, and the determined items may be provided to the second computing device from the cache by the cloud infrastructure. The items may be associated with an expiration date. An item may comprise at least one of video data, audio data, or image data. One or more of the computing devices may be mobile phones. The item may be associated with a version number.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
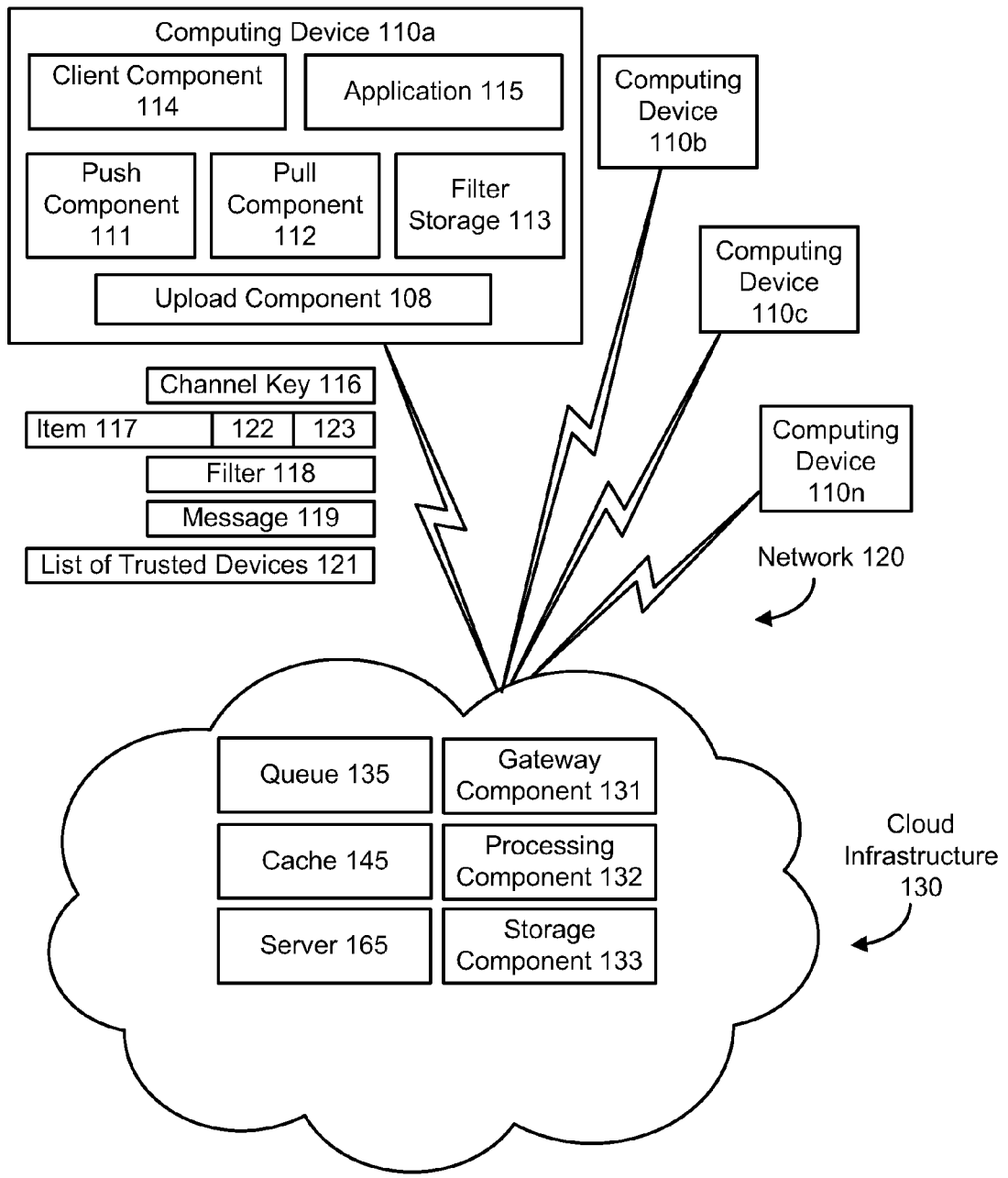
FIG. 1 is an illustration of an example system for providing and receiving items.

FIG. 1 is a block diagram of an implementation of a system 100 for providing and receiving items. As illustrated, the system 100 includes computing devices 110*a*, 110*b*, 110*c*, . . . , 110*n* and a cloud infrastructure 130 connected via a network 120. The network 120 may be a variety of network types including the public switched telephone network (PSTN), a cellular telephone network (e.g., 3G, 4G, CDMA, etc), and a packet switched network (e.g., the Internet). Any type of network and/or network interface may be used for the network 120.

The computing devices 110*a*, 110*b*, 110*c*, . . . , 110*n* may be implemented using a variety of computing devices. For example, in some implementations, the computing device 110*a* may be wireless computing device such as a cellular or mobile telephone, personal digital assistant (PDA), or a smart phone. Other types of computing devices may be used such as laptop computers, desktop computers, videogame consoles, and tablet computers. An example computing device is described with respect to the computing device 500 of FIG. 5, for example. While only computing devices 110*a*, 110*b*, 110*c*, and 110*n* are shown, it is for illustrative purposes only; it is contemplated that any number of computing devices may be supported by the system 100. Moreover, while only the computing device 110*a* is shown as having one or more components, it is for illustrative purposes only; each of the computing devices 110*b*, 110*c*, . . . , 110*n* may also have one or more of the components shown for the computing device 110*a*. In some implementations, each computing device may have an associated device identifier.

Each computing device may generate one or more items, such as an item 117. An item may include any of a variety of known data types and structures. The items may include video data (e.g., video clips in a variety of video formats), image data (e.g., photographs and other art in a variety of image formats), audio data (e.g., music and other recordings in a variety of audio formats), and document data (e.g., word processing documents, email, and instant messages in a variety of text and document formats). Any type of data may be generated. In some implementations, each item may have an associated item identifier, a version number 122, and an expiration date 123, for example.

A computing device, such as the computing device 110*a* for example, may execute one or more applications 115. An application 115 may generate and/or use the item 117 or multiple items. Examples of applications 115 may include instant messaging applications, social networking applications, email applications, word processing applications, and digital photography applications. There is no limit to the number or types of applications 115 that the computing device may execute. While only one application 115 is shown, it is for illustrative purposes only; multiple applications 115 may be executed by the computing device. In some implementations, each application 115 may have an associated application identifier.

An item 117 may be implemented using a data structure that includes a payload portion and a metadata portion. The payload portion may include the data that is generated by the application 115 such as the video data or the audio data. The metadata portion may include one or more tags that describe the payload data. For example, the metadata may include the identifier of the application 115 that generated the data, the identifier of the computing device that executed the application 115 that generated the data, a location associated with the data (e.g., GPS (global positioning system) coordinates of the computing device), a version number 122 for the item, and/or an expiration date 123. There is no limit to the type of metadata or tags that may be associated with the metadata portion.

The computing device 110*a* may communicate with the other computing devices 110*b*, 110*c*, and 110*n* through the cloud infrastructure 130. The cloud infrastructure 130 may be implemented using a server 165 or multiple servers. The server 165 may be implemented using multiple computing devices such as a computing device 500 illustrated in FIG. 5. The servers that make up or otherwise comprise the cloud infrastructure 130 may be located in a variety of geographic locations and may each provide a variety of services to the computing devices 110*a*, 110*b*, 110*c*, . . . , 110*n*. The cloud infrastructure 130 may be implemented using a variety of cloud platforms including Microsoft WINDOWS AZURE™, Google APP ENGINE, and Amazon ELASTIC COMPUTE CLOUD (EC2). Other cloud platforms may also be used.

The cloud infrastructure 130 may comprise a gateway component 131, a processing component 132, and a storage component 133. The gateway component 131 may interface with the computing devices 110*a*, 110*b*, 110*c*, . . . , 110*n* through the network 120. Accordingly, data sent between the computing devices 110*a*, 110*b*, 110*c*, . . . , 110*n* and the cloud infrastructure 130 may pass through the gateway component 131.

The processing component 132 may process data received from the gateway component 131. The processing performed by the processing component 132 may correspond to one or more services provided to the computing devices 110*a*, 110*b*, 110*c*, . . . , 110*n* by the cloud infrastructure 130.

The storage component 133 may store data such as items generated by the processing component 132 and/or received from the gateway component 131. The storage component 133 may include a cache 145 that may be used to store each item 117. The storage component 133 may further maintain a queue 135 or multiple queues corresponding to each of the computing devices 110*a*, 110*b*, 110*c*, . . . , 110*n*. The items received for a computing device may be associated with a queue 135 corresponding to the computing device by the storage component 133. Each queue 135 may correspond to a device identifier associated with a computing device, for example.

A computing device, such as the computing device 110*a*, may interface with the cloud infrastructure 130 through a client component 114. In particular, the client component 114 may expose an interface, such as an API (application programming interface), that an application 115 executing on the computing device 110*a* may use to send and receive data to the cloud infrastructure 130. For example, an application 115 may transmit data to the cloud infrastructure 130 using a publish function exposed by the client component 114. An application 115 may similarly receive data from the cloud infrastructure 130 using a receive function exposed by the client component 114. Other functions may be supported and/or exposed by the client component 114.

In some implementations, the client component 114 at the computing device 110*a* may communicate with the cloud infrastructure 130 using an upload component 108, a push component 111, and/or a pull component 112. The computing device 110*a* may use the upload component 108 to provide data (such as the item 117) to the cloud infrastructure 130. For example, the application 115 may generate an item 117 and call the publish function. In response to the publish function, the client component 114 may retrieve the item 117 and use the upload component 108 to establish a connection with the cloud infrastructure 130 and provide the item 117 to the cloud infrastructure 130. Alternatively, the upload component 108 may determine when some threshold number of items are waiting to be provided to the cloud infrastructure 130, and may establish a connection with the cloud infrastructure 130 when the threshold has been reached. Such a configuration may help preserve battery life because the number of connections to the cloud infrastructure is reduced, but increases latency because items may not be provided to the cloud infrastructure 130 until the threshold number of items is reached, for example.

The computing device 110a may use the push component 111 and/or the pull component 112 to download data (such as an item 117) from the cloud infrastructure 130. For example, the client component 114 may periodically use the pull component 112 to check for available items at the cloud infrastructure 130, and if so, establish a connection with the cloud infrastructure 130 and receive the available item(s). The client component 114 may then distribute the item(s) to one or more applications 115 depending on an application identifier associated with the item(s).

In some implementations, the pull component 112 may periodically connect to the cloud infrastructure 130 for some threshold amount of time before disconnecting. Any items that become available at the cloud infrastructure 130 for the computing device 110a during the duration of the threshold time may be pushed to the device. In this configuration, the cloud infrastructure 130 pushes the data to one or more of the computing devices immediately upon the data arriving at the cloud. Thus, as soon as the data arrives at the cloud, the cloud sends the data to one or more of the computing devices. It is contemplated that aspects of push and pull may be used in an implementation to download data from the cloud to one or more of the computing devices. Although the push component 111 and the pull component 112 are shown in FIG. 1 as disposed within the computing device 110a, a push component and a pull component may also be comprised within the cloud infrastructure, depending on the implementation.

In some implementations, the frequency (i.e., polling frequency) with which the client component 114 has the pull component 112 check for available documents may be set by the application 115. For example, if the application 115 is an instant messaging application, items 117 may be received from the cloud infrastructure 130 in near-real time, and therefore the pull component 112 may continuously check for available items 117. If the application 115 is a lower priority application (e.g., a photo sharing application), the application 115 may have the pull component 112 check the cloud infrastructure 130 for available photos less frequently (e.g., every five minutes, every ten minutes, etc.). Other polling frequencies may also be used. Some applications may use the above push configuration to get more real time and faster delivery of items. Thus, polling interval is one parameter, and the threshold time before disconnecting with the cloud is another parameter, for example.

The client component 114 may send items generated by the application 115 to the cloud infrastructure 130 according to what are referred to herein as filters. A filter 118 may comprise a set of rules or criteria that describe the types of items that a user or particular application 115 associated with a computing device, such as the computing device 110a, would like to receive. For example, a user of a photo sharing application 115 at the computing device 110a may wish to receive photos taken by their father. The father may be a user of the computing device 110b. Accordingly, the user may generate a filter 118 whose criteria include all (or only, for example) photos generated by their father at the computing device 110b, for example.

The client component 114 of the computing device 110a may provide generated filters 118 to the cloud infrastructure 130 for delivery and installation on other computing devices. Continuing the example described above, the user of the photo sharing application 115 of the computing device 110a may provide a filter 118 whose criteria is all photos generated by the user's father to the cloud infrastructure 130 for installation on the computing device 110b associated with the user's father. The next time a push component 111 or a pull component 112 of the computing device 110b requests data from the cloud infrastructure 130, the filter 118 may be provided and installed on the computing device 110b.

In some implementations, a filter 118 may be installed on a computing device 110, such as the computing device 110a, by storing the filter 118 in a filter storage 113. When an item 117 is generated by an application 115, the client component 114 may determine if the generated item 117 satisfies the criteria associated with any of the filters in the filter storage 113. If the generated item 117 satisfies any of the criteria of the filters in the filter storage 113, then the client component 114 may use the upload component 108 to provide the generated item 117 to the cloud infrastructure 130. The cloud infrastructure 130 may then provide the item 117 to the computing devices associated with the filters 118 having the satisfied criteria.

The client component 114 may provide security for generated items using encryption. In some implementations, each computing device may receive a key pair consisting of both a public and private key component. In addition, each computing device 110a, 110b, 110c, . . . , 110n may receive the public key of other computing devices. For example, when a client component 114 of the computing device 110a provides an item 117 for delivery to the cloud infrastructure 130, the client component 114 may encrypt the item using the public key of the computing device 110b so that the computing device 110b can decrypt it using its private key. In addition, the client component 114 may append a digital signature associated with the computing device 110a to the item so that the item 117 may be validated by the receiving computing device 110b using the public key of the computing device 110a.

In some implementations, the client component 114 may generate what is referred to herein as a channel key 116 for an item 117. The channel key 116 may be generated by the computing device 110a and encrypted using the public keys of the computing devices 110b and 110c, or whichever computing device 110 that the computing device 110a intends to communicate with, before the channel key 116 is provided to the cloud infrastructure 130. The computing devices 110b and 110c may then learn the channel key 116 by receiving it from the cloud infrastructure 130 and decrypt it with their respective private keys. The computing devices 110a, 110b, and 110c may then encrypt items using the channel key 116.

In some implementations, the client components of the computing devices may communicate with one another using what is referred to herein as messages. A message 119 may include the identifier of the computing device 110a and/or application 115 that originated the message, an identifier or identifiers of one or more of the computing devices 110b or 110c that are to receive the message, and a message payload, for example. When a message 119 is received by the cloud infrastructure 130, the message 119 may be associated with the queues corresponding to the identifiers of the computing devices 110b and 110c that are to receive the message 119, and the message 119 may be stored in the cache 145, for example.

In some implementations, the message 119 may include a filter message, an item message, and/or a key distribution message. A filter message may have a payload that includes a filter 118 and may be used to install filters on one or more of the computing devices 110a, 110b, 110c, . . . , 110n. An item message may have a payload that includes an item 117. A key distribution message may have a payload that includes a channel key 116 that can be used to decrypt a forthcoming item 117 in an item message. Other types of messages may be used.

In some implementations, the messages may include expiration times. An expiration time may specify a time after which the message 119 may not be delivered by the cloud infrastructure 130. When the cloud infrastructure 130 retrieves messages associated with a queue 135 for delivery to one of computing devices 110a, 110b, 110c, ..., 110n, the processing component 132 may determine if an expiration date associated with each message 119 has expired. The processing component 132 may then delete messages with dates that have expired (i.e., expired expiration dates).

For example, a user of a computing device 110a may generate a message 119 to their friends, using a social networking application 115, which asks if any of them are available for dinner. Because of the immediate temporal nature of the request, the user may specify that the message 119 expires after 12 hours. After sending the message 119 to the cloud infrastructure 130, the message 119 is associated with the queue 135 corresponding to the computing devices 110b and 110c (i.e., the computing devices associated with the friends). One hour later the user of the computing device 110b requests messages from the cloud infrastructure 130 and is provided the message 119 because it has not yet expired. 13 hours later the user of the computing device 110c requests messages from the cloud infrastructure 130 and is not provided the message 119 because it has expired.

As described above, the computing devices 110a, 110b, 110c, ..., 110n are able to receive items generated by other users by installing filters on the computing devices of the users whose items they wish to receive. For example, if a user of the computing device 110a wishes to receive items 117 from a user associated with the computing device 110b, the user of the computing device 110a may install a filter 118 on the computing device 110b.

Thus, it is determined on the computing devices 110a, 110b, 110c, ..., 110n themselves whether or not a generated item 117 may be provided to other users (using other computing devices), rather than at the cloud infrastructure 130 or at another centralized location. In this manner, in an implementation, a generated item 117 is only provided to the cloud infrastructure 130 if it matches the criteria of a filter 118, thereby avoiding performing the evaluation at the server, resulting in a saving of bandwidth and processing resources, for example. Moreover, because the evaluation of an item 117 is performed at one of the computing devices 110a, 110b, 110c, ..., 110n, the item 117 may be encrypted before it is provided to the cloud infrastructure 130. The cloud infrastructure 130 does not need to decrypt the item, thereby reducing privacy concerns for the users.

To further protect the privacy of users, the cloud infrastructure 130 may allow users of computing devices 110a, 110b, 110c, ..., 110n to publish or provide lists of users or other computing devices that are trusted (e.g., a list of trusted computing devices 121). The list(s) of trusted computing devices 121 may be maintained by the processing component 132 of the cloud infrastructure 130 and may be used to prevent unauthorized devices from providing filters or from providing messages that include filters. For example, a user of the computing device 110a may provide a list of trusted computing devices 121 to the cloud infrastructure 130. The list of trusted computing devices 121 may include the computing device 110b, but not the computing device 110c. At a later time, a user of the computing device 110b may provide a filter 118 for installation on the computing device 110a to the cloud infrastructure 130. Before sending the filter 118 to the computing device 110a, the processing component 132 of the cloud infrastructure 130 may use the list of trusted computing devices 121 associated with the computing device 110a to determine that the computing device 110b is trusted. After determining that the computing device 110b is trusted, the filter 118 may be provided to the computing device 110a.

Similarly, a user of the computing device 110c may provide a filter 118 for installation on the computing device 110a to the cloud infrastructure 130. Before sending the filter 118 to the computing device 110a, the processing component 132 of the cloud infrastructure 130 may use the list of trusted computing devices 121 associated with the computing device 110a to determine that the computing device 110c is not trusted. After determining that the computing device 110c is not trusted, the processing component 132 may discard the filter 118 and/or provide a message 119 (e.g., an error message) to the computing device 110c.

In some implementations, a user of a computing device may want to receive items from a subset of their friends. For example, a user of the computing device 110a may want to receive photographs taken by their friends. The friends may be associated with the computing devices 110b, 110c, and 110n. The user (via the computing device 110a) may generate a filter 118 for each of their friends in the subset, and provide each generated filter 118 to the cloud infrastructure 130 for distribution and installation on each of the computing devices 110b, 110c, and 110n associated with the user's friends. As may be appreciated, if a user has many friends, generating and providing each message 119 to install each filter 118 may be time and bandwidth consuming. Moreover, if the user meets new friends at a later time, new filters may be generated for the new friends before the user can receive photographs taken by the new friends.

To allow for a more efficient filter installation among groups of friends, the processing component 132 of the cloud infrastructure 130 may support what is referred to herein as a group. A group may comprise a list of one or more computing devices 110a, 110b, 110c, ..., 110n and may correspond to friends in a social networking application or an email distribution list, for example. The group may include one or more device identifiers associated with the one or more computing devices 110a, 110b, 110c, ..., 110n in the group.

Continuing the example described above, to use a group, a user of the computing device 110a may generate a filter 118, but rather than associate the filter 118 with each of the computing devices 110b, 110c, and 110n, the user may associate the filter 118 with a group and provide the filter 118 to the cloud infrastructure 130 in a message 119. The processing component 132 of the cloud infrastructure 130 may receive the filter 118 in the message 119 and distribute the filter 118 to each computing device that is part of the group (i.e., computing devices 110b, 110c, and 110n).

In some implementations, the members of a group may be dynamic. For example, a user of the computing device 110a may create a group that includes their friends who are currently located in California. The locations of the users may be determined by a GPS or other location determining means associated with those users' computing devices. Thus, for example, if the computing device 110b moves in and out of California, it may be added or removed from the group dynamically by the processing component 132.

Because of the stateless nature of the cloud infrastructure 130, it may be difficult for a computing device, such as the computing device 110a, to determine if a message 119 associated with an item 117 has been received. To provide for stronger reliability guarantees, the computing device 110a may further install filters 118 on other computing devices, such as the computing devices 110b and 110c, which match positive or negative acknowledgment messages generated by an application 115. Generated acknowledgment messages that match the installed filters may be forwarded by the client component 114 to the cloud infrastructure 130 for delivery. If a threshold amount of time passes before an acknowledgement message is received after a client component 114 provides a generated message 119 to the cloud infrastructure 130, the client component 114 may resend the generated message 119 to the cloud infrastructure 130.

Alternatively or additionally, rather than resend the generated message 119 to the cloud infrastructure 130, the client component 114 may instruct the cloud infrastructure 130 to retrieve the message 119 from its cache 145, and resend the message 119 from the cache 145. By instructing the cloud infrastructure 130 to resend the message 119 from the cache 145, bandwidth is saved because the original message 119 is only transmitted one time to the cloud infrastructure 130.

As may be appreciated, because of the transient and intermittent nature of mobile computing devices, a computing device may not request messages 119 from the cloud infrastructure for an extended period of time. For example, the computing device 110a may send a message 119 to the computing device 110b. The computing device 110b may not request messages from the cloud infrastructure 130 for an extended period of time. In implementations that use the acknowledgement messages described above, not requesting messages from the cloud infrastructure 130 may be interpreted by the computing device 110a as a message failure, resulting in the unnecessary resending of messages by the cloud infrastructure 130. Accordingly, when the cloud infrastructure 130 receives a request to resend a previously sent message 119 from the cache 145, the processing component 132 may first determine if the computing device 110b has requested messages since the last message 119 was generated, and if not, may inform the computing device 110a that the message has not been requested yet by the computing device 110b.

As described above, expiration dates may be associated with each message 119. Therefore, computing devices that infrequently connect to the cloud infrastructure 130 may not receive messages 119 that are stale nor no longer relevant. In another implementation, the messages, or the items included the messages, may further be associated with version numbers. The processing component 132 may then only provide messages or items to a computing device that has a latest or most recent version number.

For example, a user of the computing device 110a and a user of the computing device 110b may be collaborating using an application 115 such as a word processing application. The user of the computing device 110a may generate a latest version of a document and the client component 114 may send it to the cloud infrastructure 130 for delivery to the computing device 110b according to a filter 118. Before the computing device 110b may request messages from the cloud infrastructure 130, the user of the computing device 110a may generate an updated version of the document and the client component 114 may send it to the cloud infrastructure 130 for delivery to the computing device 110b according to the filter 118. When the computing device 110b requests messages from the cloud infrastructure 130, the processing component 132 may determine that there are two versions of the same document in the queue 135 corresponding to the computing device 110b and may only provide the document having the most recent version number to the computing device 110b.

Figure 2:
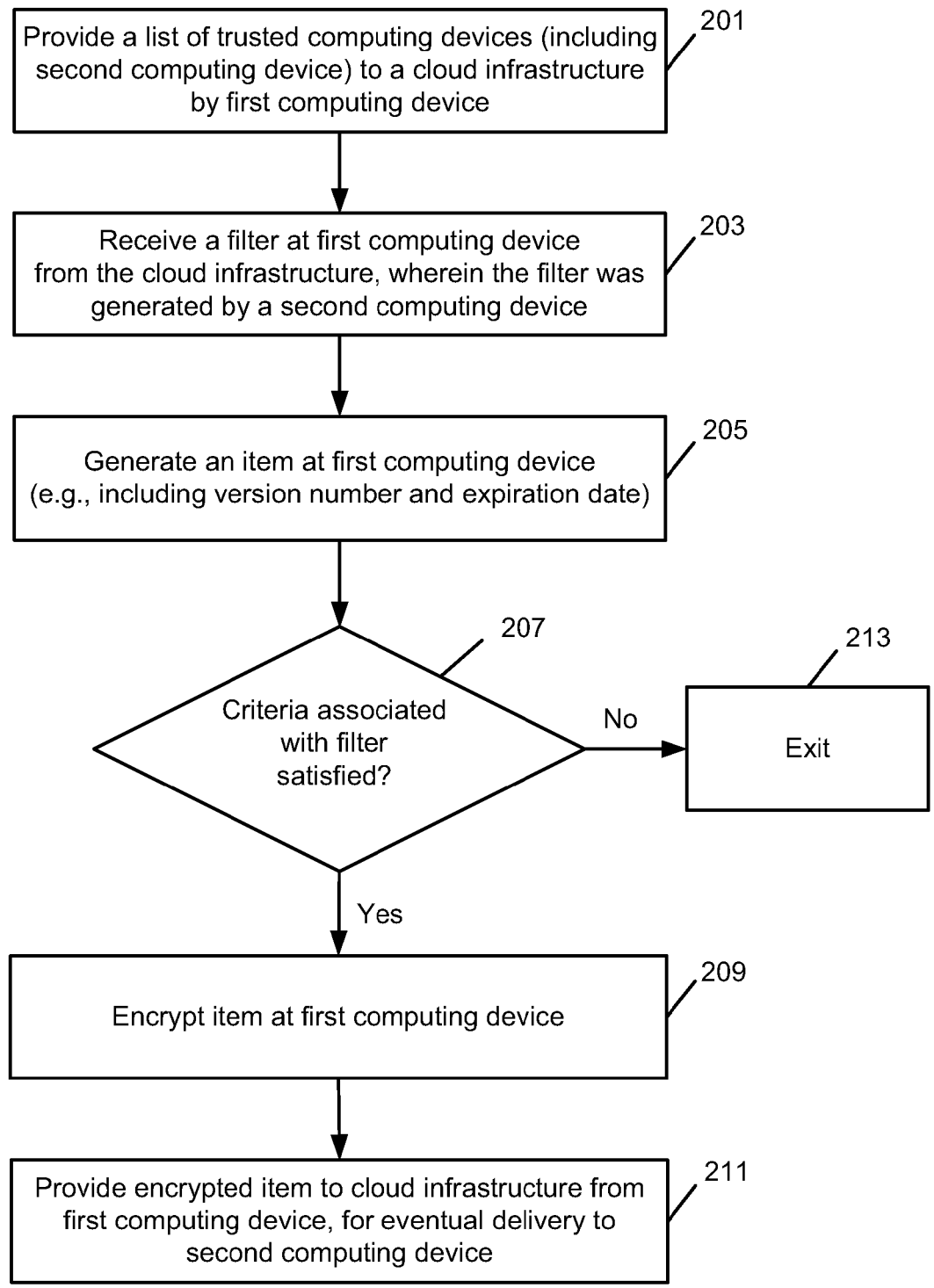
FIG. 2 is an operational flow of an implementation of a method for providing a generated item according to a filter.

FIG. 2 is an operational flow of an implementation of a method 200 for providing a generated item according to a filter. The method 200 may be implemented by the computing device 110a, for example.

A list of trusted computing devices is provided at 201. The list of trusted computing devices 121 may be provided by a client component 114 of the computing device 110a to the cloud infrastructure 130. In some implementations, the list of trusted computing devices 121 may be a list of computing devices such the computing devices 110b and 110c that the computing device 110a may receive filters from. The list of trusted computing devices 121 may correspond to a list of "friends" in a social networking application, for example. The cloud infrastructure 130 may only provide filters to the computing device 110a that originate from the computing devices 110b and 110c on the list of trusted computing devices.

A filter is received at 203. The filter may be received by the push component 111 or the pull component 112 of the computing device 110a. The filter 118 may be passed to the client component 114 and stored in the filter storage 113. The filter 118 may be associated with one or more other computing devices 110 such as the computing device 110b and may include one or more criteria. The criteria may specify rules or conditions that may be met by an item 117 for the item 117 to be provided to the computing device 110b that is associated with the filter 118.

At some point, an item is generated at 205. The item 117 may be generated by an application 115 of the computing device 110a. The item 117 may comprise any of a variety of data types and/or data structures such as video data, audio data, and document data. For example, the application 115 may be an instant messaging application and the item 117 may be an instant message. In some implementations, the item 117 may have a version number 122 and/or an expiration date 123.

A determination is made as to whether the item satisfies the criteria associated with the filter at 207. The determination may be made by the client component 114. In some implementations, the filter 118 criteria may comprise a Boolean equation that takes as an input one or more of the metadata associated with the item 117. For example, the filter 118 criteria may be "all items that are photos that have a location equal to New York". If the item 117 satisfies the filter 118 criteria, then the method may continue at 209. Otherwise, the method may exit at 213.

The item is encrypted at 209. The item 117 may be encrypted by the client component 114 of the computing device 110a. In some implementations, the item 117 may be encrypted using a channel key 116 that is generated by the client component 114 and subsequently encrypted using the public key associated with computing device 110b that will receive item 117. The receiving computing device can then learn the channel key 116 by decrypting it using its public key.

The encrypted item is provided at 211. In an implementation, the encrypted item 117 may be provided to the cloud infrastructure 130 by the upload component 108 of the computing device 110a.

Figure 3:
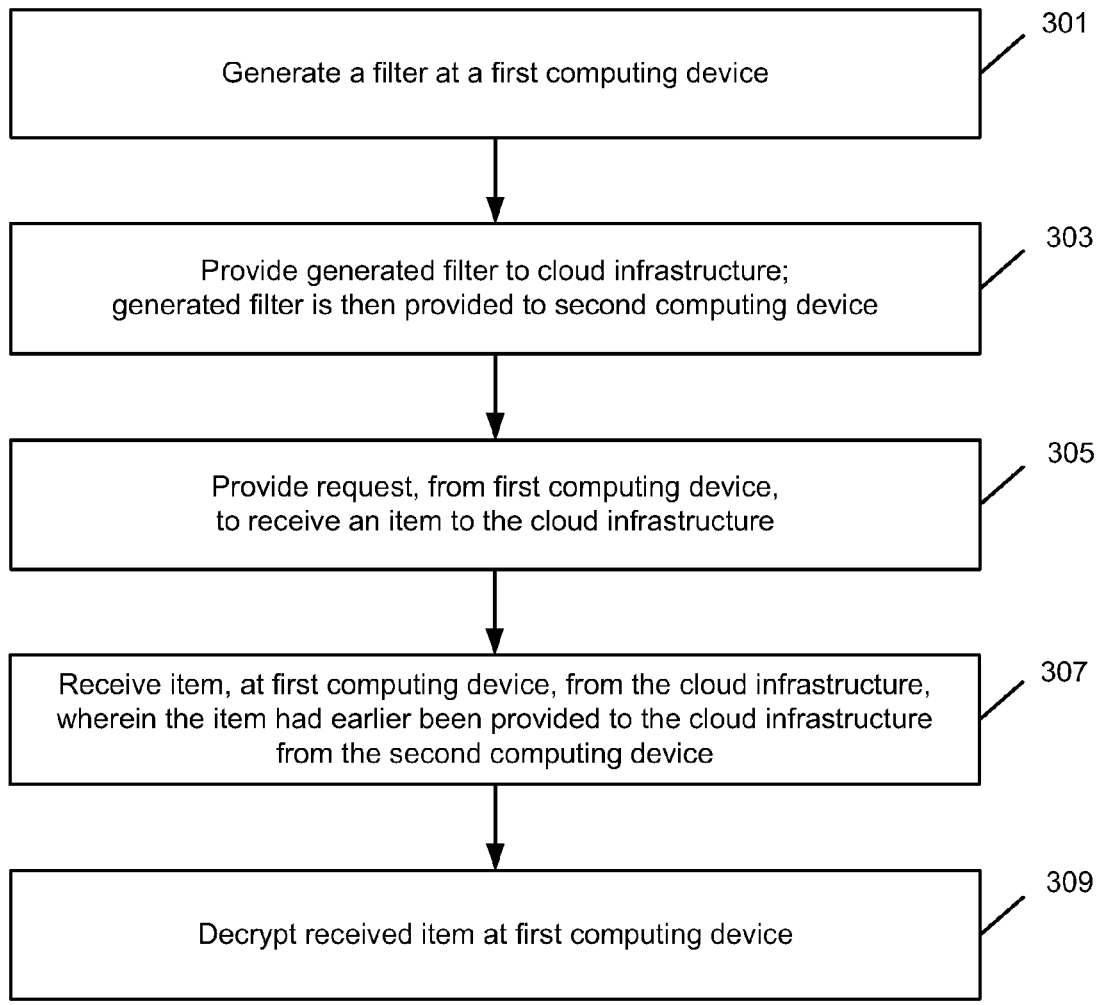
FIG. 3 is an operational flow of an implementation of a method for receiving a generated item according to a filter.

FIG. 3 is an operational flow of an implementation of a method 300 for receiving a generated item according to a filter. The method 300 may be implemented by the computing device 110a.

A filter is generated at 301. The filter 118 may be generated by the client component 114 and/or the application 115 of the computing device 110a. The filter 118 may have one or more criteria for items 117 that are to be delivered to the computing device 110a. For example, a user of an application 115 such as a social networking application may wish to receive status updates of a friend. Accordingly, the user may use the social networking application to generate a filter 118 that may be installed on the computing device 110b associated with their friend having a criteria that is met by each item 117 that is a status update.

The generated filter is provided at 303. The generated filter 118 may be provided by the upload component 108 of the computing device 110a to the cloud infrastructure 130. In some implementations, the cloud infrastructure 130 may provide the generated filter 118 to the push component 111 or the pull component 112 of the computing device 110b the next time the computing device 110b requests an item 117 from the cloud infrastructure 130. The generated filter 118 may be provided in a message 119.

At some point, a request to receive an item is provided at 305. The request to receive an item 117 may be provided by the pull component 112 of the computing device 110a to the cloud infrastructure 130. The pull component 112 may provide the request on behalf of the client component 114 or based on a predetermined polling frequency, for example. The cloud infrastructure 130, in response to receiving the request, may retrieve each message 119, including items, filters, and keys, associated with a queue 135 corresponding to the computing device 110a at the cloud infrastructure 130.

An item is received at 307. The item 117 may be received by the pull component 112 of the computing device 110a. The received item 117 may be provided to the client component 114 of the computing device 110a. The item may 117 be provided in a message 119.

The item is decrypted at 309. The item 117 may be decrypted by the client component 114 using a private key associated with the computing device 110a. In some implementations, the item 117 may be decrypted using a channel key 116 that was generated by the computing device 110b that generated the received item 117. The channel key 116 may have been received by the client component 114 in a message 119.

Figure 4:
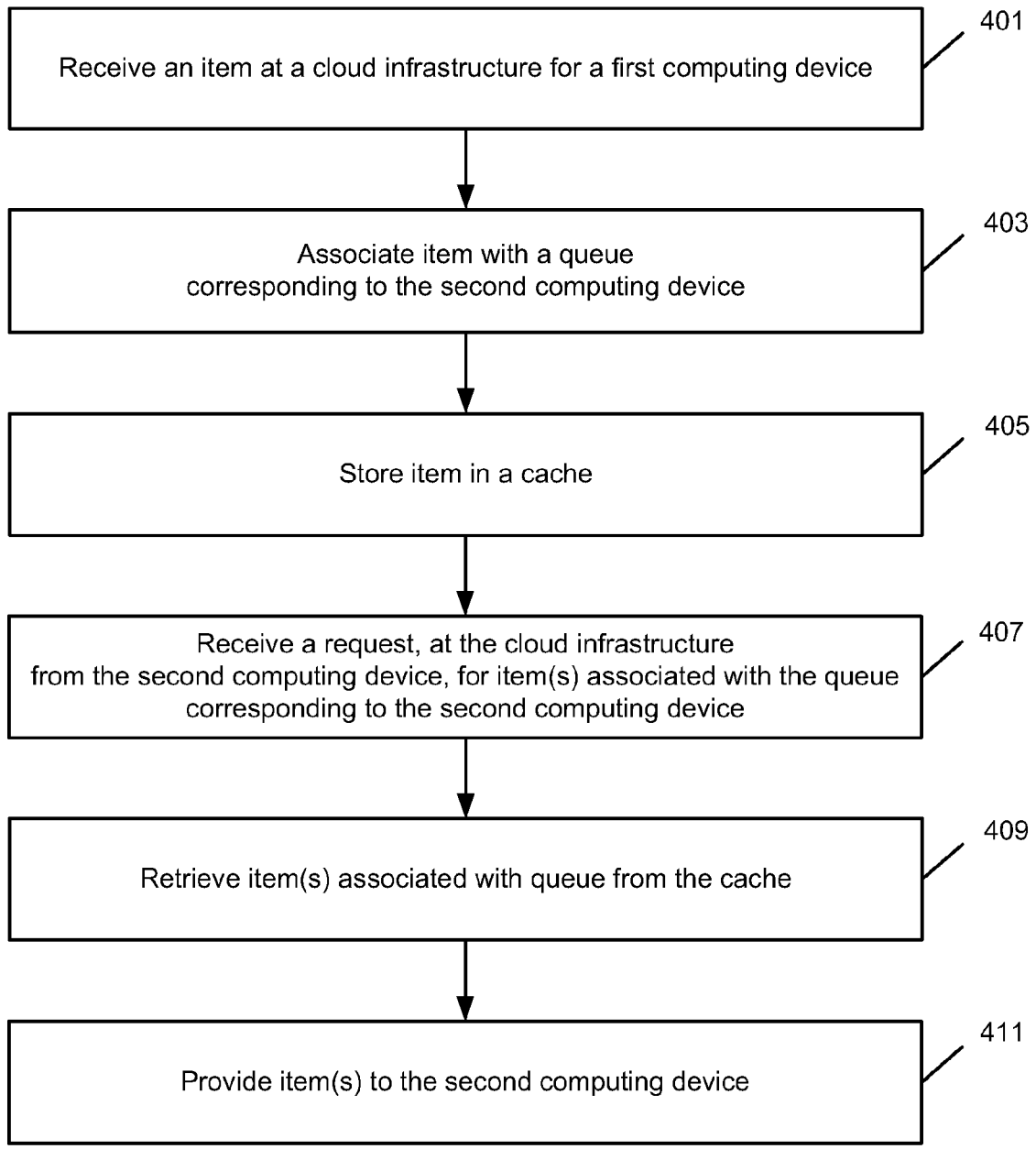
FIG. 4 is an operational flow of an implementation of a method for receiving and providing items using a cloud infrastructure.

FIG. 4 is an operational flow of an implementation of a method 400 for receiving and providing items using a cloud infrastructure. The method 400 may be implemented by the cloud infrastructure 130.

An item is received at 401. The item 117 may be received by a gateway component 131 of a cloud infrastructure 130. The item 117 may have been generated by an application 115 of the computing device 110a, and may have been provided to the cloud infrastructure 130 because it satisfied the criteria of a filter 118 installed by the computing device 110b. The item 117 may be received by the gateway component 131 in a message 119 that identifies the computing device 110b.

The item is associated with a queue at 403. The item 117 may be associated with a queue 135 by the processing component 132 of the cloud infrastructure 130. The queue 135 may be a queue 135 that corresponds to the computing device 110b.

The item is stored in a cache at 405. The item 117 may be stored by the storage component 133 of the cloud infrastructure 130.

A request for items associated with the queue is received at 407. The request may be received by the gateway component 131 of the cloud infrastructure 130. The request may be received from the pull component 112 of the computing device 110b.

Items associated with the queue are retrieved from the cache at 409. The items may be retrieved from the cache 145 by the storage component 133 of the cloud infrastructure 130. The retrieved items may include the received item 117 and any other items or messages that were associated with the queue 135 since the last time items were requested by the pull component 112 of the computing device 110b.

In some implementations, expiration dates associated with one or more of the items may be determined, and only items with expiration dates that have not yet expired may be retrieved. Items having expired expiration dates may be deleted.

The retrieved items are provided at 411. The retrieved items 117 are provided to the pull component 112 of the computing device 110b by the gateway component 131 of the cloud infrastructure 130.

Figure 5:
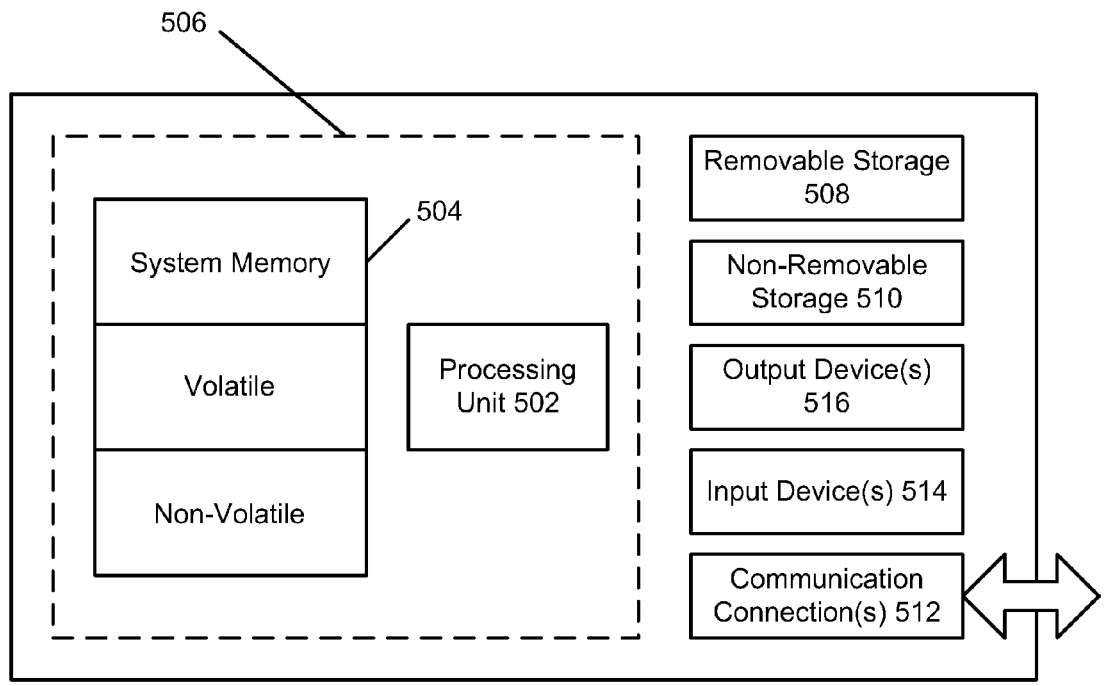
FIG. 5 shows an exemplary computing environment.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a filter from a cloud infrastructure by a first computing device, wherein the filter has a criteria and is associated with a second computing device;
   installing the received filter at the first computing device;
   generating an item by the first computing device;
   determining that metadata associated with the item matches the associated criteria of the installed filter by the first computing device; and
   in response to the determination, providing the item to the cloud infrastructure for delivery to the second computing device by the first computing device.

2. The method of claim 1, further comprising publishing a list of computing devices trusted by the first computing device to the cloud infrastructure by the first computing device.

3. The method of claim 2, further comprising:
   receiving a filter from the second computing device for delivery to the first computing device by the cloud infrastructure;
   determining if the second computing device is on the list of computing devices trusted by the first computing device; and
   if so, providing the filter to the first computing device by the cloud infrastructure.

4. The method of claim 1, further comprising:
   receiving the generated item at the cloud infrastructure; and
   associating the generated item with a queue corresponding to the second computing device.

5. The method of claim 4, further comprising storing the item in a cache by the cloud infrastructure.

6. The method of claim 5, further comprising:
   receiving a request at the cloud infrastructure from the second computing device for any items associated with the queue corresponding to the second computing device;
   determining items associated with queue corresponding to the second computing device by the cloud infrastructure;
   retrieving the determined items from the cache by the cloud infrastructure; and
   providing the determined items from the cache by the cloud infrastructure to the second computing device.

7. The method of claim 1, wherein the metadata comprises a geographic location associated with the first computing device.

8. The method of claim 1, wherein the filter comprises a Boolean equation that takes as an input the metadata associated with the item.

9. The method of claim 1, wherein the first computing device encrypts the item before providing the item to the cloud infrastructure.

10. A method comprising:
    generating a filter by a first computing device, wherein the filter is associated with a criteria and the first computing device;
    providing the generated filter to a cloud infrastructure for delivery to a second computing device by the first computing device, wherein the generated filter is installed by the second computing device;
    providing a request to receive an item to the cloud infrastructure by the first computing device; and
    receiving an item from the cloud infrastructure by the first computing device, wherein metadata associated with the item matches the criteria of the filter and the item was generated by the second computing device.

11. The method of claim 10, further comprising:
    receiving the filter at the cloud infrastructure from the first computing device by the cloud infrastructure;
    receiving a list of computing devices trusted by the second computing device by the cloud infrastructure;
    determining if the first computing device is on the list of computing devices trusted by the second computing device; and
    if so, associating the received filter with a queue corresponding to the second computing device.

12. The method of claim 10, wherein the item is associated with a version number.

13. The method of claim 10, wherein the first computing device is a mobile phone.

14. The method of claim 10, wherein the received item was encrypted by the second computing device, and further comprising decrypting the item by the first computing device.

15. A system comprising:
    a cloud infrastructure;
    a first computing device that:

generates a filter, wherein the filter has an associated criteria and is associated with the first computing device; and provides the filter to the cloud infrastructure; and a second computing device that:

receives the filter from the cloud computing device;

installs the received filter at the second computing device;

generates an item;

determines that metadata associated with the item matches the criteria associated with the filter; and in response to the determination, provides the item to the cloud infrastructure.

16. The system of claim 15, wherein the second computing device encrypts the item before providing the item to the cloud infrastructure.

17. The system of claim 15, wherein the second computing device associates the item with an expiration date.

18. The system of claim 15, wherein the cloud infrastructure further:

receives the item;

associates the item with a queue corresponding to the first computing device; and stores the item in a cache.

19. The system of claim 18, wherein the cloud infrastructure further:

receives a request for any items associated with the queue corresponding to the first computing device;

determines items associated with the queue corresponding to the first computing device; and provides the determined items associated with the queue corresponding to the first computing device to the first computing device.

20. The system of claim 15, wherein the item is one of video data, audio data, or image data.

* * * * *